July 26, 1949.  P. W. BROWNE  2,477,361
DISK SHARPENING MACHINE
Filed Sept. 21, 1946  2 Sheets-Sheet 1
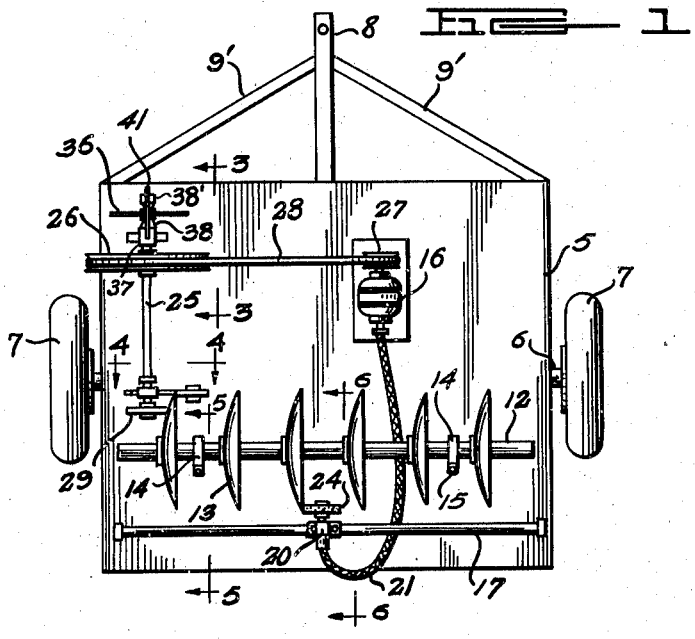
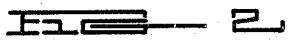
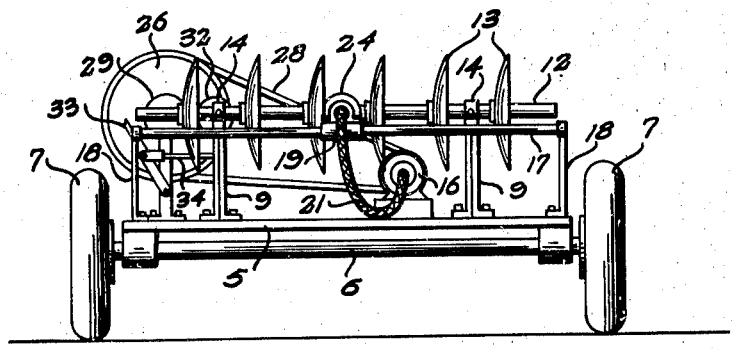
Inventor
PAUL W. BROWNE
By Clarence A. O'Brien
and Harvey B. Jacobson
Attorneys July 26, 1949.  P. W. BROWNE  2,477,361
DISK SHARPENING MACHINE
Filed Sept. 21, 1946  2 Sheets-Sheet 2
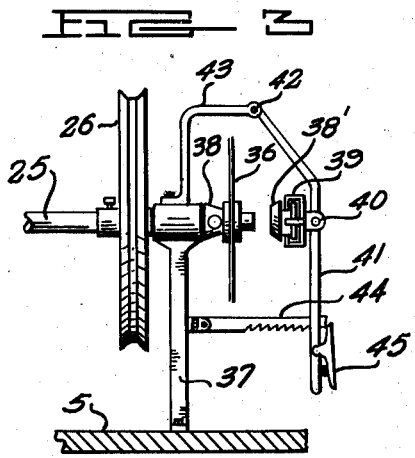
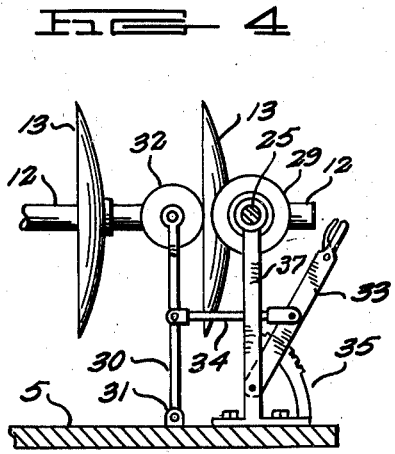
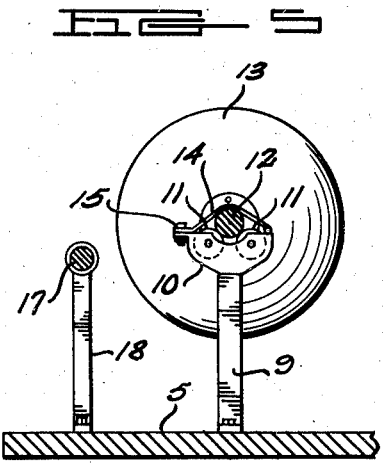
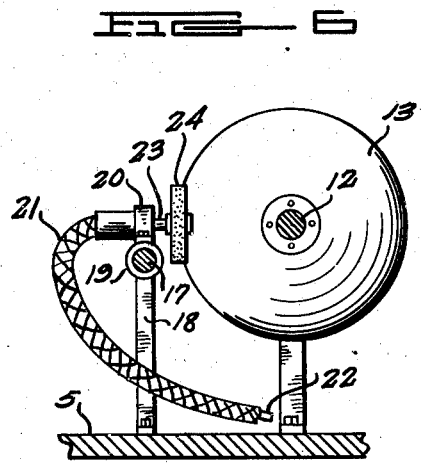
Inventor
PAUL W. BROWNE
By *Clarence A. O'Brien and Harvey B. Jacobson*
Attorneys Patented July 26, 1949

2,477,361

UNITED STATES PATENT OFFICE 2,477,361

DISK SHARPENING MACHINE

Paul W. Browne, Roodhouse, Ill., assignor of forty-nine per cent to Lee Hardwick, Roodhouse, Ill.

Application September 21, 1946, Serial No. 698,519

3 Claims. (Cl. 51—104)

This invention relates to certain new and useful improvements in machines for sharpening the earth working discs of agricultural implements, such as those of plows and harrows.

An object of the present invention is to provide a machine of the above kind which is simple in construction and efficient in operation, and by means of which the operation of sharpening the discs may be readily performed in an expeditious manner.

Another object of the invention is to provide a portable machine of the above kind which is in the nature of a trailer vehicle adapted to be towed by a motor vehicle for use in the field.

Still another object of the invention is to provide a machine of the above kind including a supporting platform, means for removably journalling a shaft with a gang of discs in a horizontal position on said platform, an emery wheel, a motor mounted on the platform, novel means for driving the gang of discs from said motor including a driven counter-shaft and a manually releasable friction drive connection between said counter-shaft and one of the discs, a flexible shaft connecting the motor with the emery wheel, and means to mount the emery wheel on the platform for movement parallel with the shaft of the discs and for vertical swinging movement so that the emery wheel may be readily successively engaged with the successive discs of the gang.

Still further objects and features of the invention will become apparent from the following description when considered in connection with the accompanying drawings, in which:

Figure 1 is a top plan view of a disc sharpening machine constructed in accordance with the present invention.

Figure 2 is a rear elevational view thereof.

Figure 3 is an enlarged fragmentary section taken on line 3—3 of Figure 1.

Figure 4 is an enlarged fragmentary section taken on line 4—4 of Figure 1.

Figure 5 is an enlarged fragmentary section taken on line 5—5 of Figure 1, and

Figure 6 is an enlarged fragmentary section taken on line 6—6 of Figure 1.

Referring in detail to the drawings, the illustrated embodiment of the invention is in the form of a trailer vehicle adapted to be towed by a motor vehicle for use in the field, and including a platform 5 mounted intermediate the front and rear thereof upon a transverse axle 6 having coaxial ground engaging supporting wheels 7 journalled on the projecting ends thereof. At the front, the platform 5 is provided with a central forwardly projecting draft bar or tongue 8 which may be braced as at 9' and coupled at its forward end to the rear of the towing vehicle.

Rigidly mounted upon and near the rear of the platform 5 is a pair of laterally spaced standards 9, each of which is provided at the top with a shaft rest 10 having spaced rollers 11 upon which the shaft 12 of the gang of discs 13 to be sharpened is adapted to be rotatably supported. For this purpose, the rollers 11 are spaced apart a distance less than the diameter of the shaft 12 so that the latter will be supported with its axis in a vertical plane passing between the rollers 11. In order to releasably hold the shaft 12 down in engagement with the rollers 11 or against accidental displacement from between them, each rest 10 is provided with a confining strap 14 adapted to be disposed across the shaft 12 and detachably fastened down as at 15. The strap 14 prevents upward or lateral displacement of the shaft 12 from its position resting upon the rollers 11, although exerting no frictional or clamping pressure on the shaft 12.

Mounted on the platform 5 forwardly of the standards 9 is a suitable motor 16 which may be an electric motor or an internal combustion engine. This motor has a drive shaft which projects both forwardly and rearwardly for a purpose which will presently become apparent.

Mounted in a horizontal position transversely of the platform 5 and rearwardly of the standards 9 is a guide rod 17, the ends of said guide rod being secured in sockets provided at the upper ends of spaced supporting standards 18 secured on the platform 5. Slidable on the rod 17 is a sleeve 19 upon which is detachably secured a block 20 attached to one end of the flexible housing or tubing 21 that encases a flexible shaft 22 having one end coupled to the rear projecting end of the drive shaft of motor 16. The other end of shaft 22 is coupled to the shaft 23 of a grinding wheel or emery wheel 24 disposed directly in front of the sleeve 19. Sleeve 19 is free to turn about rod 17 as well as to slide longitudinally of the latter, and the arrangement is such that when the sleeve 19 is positioned as shown in Figure 6, the emery wheel 24 is arranged to engage the edge of the adjacent disc 13 for sharpening the latter. By turning the sleeve 19 in the proper direction, the emery wheel 24 may be tilted upwardly and rearwardly so as to disengage the adjacent disc, whereupon the sleeve 19 may be adjusted longitudinally of the rod 17 for the purpose of engaging the emery wheel 24 with the next or succeeding disc 13 of the gang. This may be done so as to successively sharpen all of the discs, and it will be apparent that the emery wheel 24 may be engaged with the edge of each disc at both sides of the latter if needed to properly sharpen the same. The adjustment of the sleeve 19 along the rod 17 is permitted by making the flexible shaft sufficiently long for the purpose. Obviously, when the motor 16 is placed in operation, the emery wheel 24 is rapidly rotated to effect the desired sharpening operation. After the sharpening of all of the discs is accomplished, the shaft 12 with its gang of discs may be readily removed by releasing the hold-down straps 14.

In order to secure a uniform sharpening of the discs entirely around their edges, the shaft 12 is slowly rotated so as to rotate the discs during the sharpening operation with respect to each disc. As the discs 13 are secured on the shaft 12, it will be apparent that rotation imparted to an end one of the discs 13 will cause rotation of all of them and the shaft 12. Mounted longitudinally of and along one side of the platform 5 is a counter-shaft 25 having a large pulley 26 secured thereon near the forward end thereof. Pulley 26 is aligned with a small pulley 27 secured on the forwardly projecting end of the drive shaft of motor 16, and an endless power transmission belt 28 is passed around the pulleys 26 and 27 so that rotation of the drive shaft of motor 16 is transmitted to the counter-shaft 25. Secured on the rear end of counter-shaft 25 is a friction wheel 29 disposed to engage the outer side of the adjacent end one of the discs 13 for driving the latter when the gang of discs is properly positioned for sharpening of the discs. It will be noted that the shaft 12 is displaceable relative to the standards 9 axially of said shaft 12, so that an effective driving connection is provided between the wheel 29 and the adjacent disc when the latter is pressed toward and against the periphery of the wheel 29. In order to so press the adjacent end disc 13 against the periphery of the wheel 29, I provide an arm 30 which is pivoted at its lower end upon the platform 5 as at 31 and which has a friction wheel 32 journalled in the upper end thereof. The arm 30 and wheel 32 are so arranged that the wheel 32 may engage the adjacent end disc 13 at the inner side of the latter. Thus, by swinging the arm 30 outwardly, wheel 32 is caused to press the adjacent disc 13 into engagement with the periphery of the friction drive wheel 29. Such movement of arm 30 may be effected by suitable means such as a hand lever 33 connected with the arm 30 by a link 34, suitable means being provided to latch the lever 33 in adjusted position. The latching means referred to may consist of a conventional rack segment 35 co-acting with a latch pin of lever 33 as is conventional in the machine element art. By swinging the arm 30 inwardly, wheel 32 may be disengaged from the adjacent disc 13 so that insufficient friction is had between the wheel 29 and said adjacent disc 13 for driving the gang of discs.

The present invention also contemplates the provision of means whereby a single flat earth working disc 36 may be supported and driven for being sharpened by the emery wheel 24 upon detachment of the block 20 from the sleeve 19, such flat earth working discs being commonly employed as rolling cutters for various agricultural implements. For instance, such a flat rolling disc cutter is employed as a coulter for certain types of plows. Counter-shaft 25 is supported by spaced standards 37, one of which is arranged directly in front of the pulley 26 as shown in Figure 3. The shaft 25 projects forwardly of its front standard 37, and the projecting forward end of said shaft 25 has a centering cone 38 secured thereon. This cone is adapted to be received in the hub of the disc 36 at the rear of the latter, and a similar centering cone 38' is adapted to be removably received on the shaft 25 in front of the disc 36 for reception in the hub of the latter at the front of said disc 36. By forcing the centering cone 38' rearwardly, the cones 38 and 38' will provide an efficient driving connection between the disc 36 and shaft 25 with said disc 36 accurately centered with respect to the shaft 25. As shown, the centering cone 38' is swivelled in a bracket 39 hinged at 40 to a lever 41, and lever 41 is pivoted at its upper end as at 42 to a bracket 43 secured upon the front standard 37. A rack bar 44 is fixed to the standard 37 and projects through the lower end portion of lever 41, and a spring pressed catch 45 is carried by the lower end of lever 41 for engagement with the teeth of the rack bar 44. The purpose of the catch 45 and rack bar 44 is to provide means for releasably securing the lever 41 in rearwardly swung position with the cone 38' properly entered into the hub of the disc 36 to provide the centered driving connection between the shaft 25 and said disc 36. When this is done, disc 36 is effectively driven by motor 16 so that the emery wheel 24 may be used to sharpen the edge of said disc 36 when the emery wheel is driven by the motor 16. At this time, the emery wheel is, of course, supported in the hand by gripping the adjacent end of the shaft housing 21. Obviously, when sharpening of the disc 36 has been completed, catch 45 may be disengaged from rack bar 44 so that lever 41 may be swung forwardly to remove the centering cone 38' from the shaft 25 and thereby permit removal of the disc 36 from the latter.

From the foregoing description, it is believed that the construction, operation and advantages of the present invention will be readily understood and appreciated by those skilled in the art. Modifications and changes in details of construction are contemplated, such as fall within the spirit and scope of the invention as claimed.

What I claim is:

1. A disc sharpening machine comprising a platform, a pair of laterally spaced standards mounted on the platform near the rear of the latter, shaft rests carried by the upper ends of said standards for rotatably supporting the shaft of a gang of discs transversely of the platform, a hold-down element for maintaining the shaft of the gang of discs in the rest of each standard, a guide rod mounted in an elevated position transversely of the platform rearwardly of said standards, a sleeve longitudinally slidable on said guide rod, a flexible shaft having a flexible housing coupled at one end to said sleeve so as to be detachable from the latter, an emery wheel attached to one end of said flexible shaft, a motor mounted on the platform in front of said standards and having a rearwardly projecting drive shaft coupled to the other end of said flexible shaft for driving the latter, a friction wheel engageable with an end one of a gang of discs supported in the rests of said standards for driving said gang of discs, and driving connections between said motor and said friction wheel.

2. The construction defined in claim 1, in combination with a counter-shaft journalled on the platform longitudinally of and near one side of the latter, a driving connection between said counter-shaft and said motor, said friction wheel being secured on the rear end of the counter-shaft, and manually operable means for effecting movement of the gang of discs transversely of the platform and toward the friction wheel for providing an effective friction drive connection between said friction wheel and the adjacent end one of the gang of discs.

3. A disc sharpening machine comprising a two-wheeled trailer vehicle having a platform and a forwardly projecting draft tongue, a motor mounted on and near the front of said platform and having a rearwardly projecting drive shaft, a countershaft journaled on said platform longitudinally of and near one side of the latter, a driving connection between said motor and said countershaft, means to removably journal a gang of earth working discs upon the platform transversely of and near the rear of the latter, a friction wheel secured on the rear end of said countershaft and engageable with an end disc of said gang of discs for driving the latter, an emery wheel, and a flexible shaft operatively connecting the drive shaft of the motor and the emery wheel so as to drive the latter for use in sharpening the edges of the gang of earth working discs.

PAUL W. BROWNE.

REFERENCES CITED

The following references are of record in the file of this patent:

UNITED STATES PATENTS

| Number | Name | Date |
|---|---|---|
| 736,829 | Donnell | Aug. 18, 1903 |
| 823,857 | Greene | June 19, 1906 |
| 865,627 | Brower et al. | Sept. 10, 1907 |
| 1,481,621 | Neuman | Jan. 22, 1924 |
| 1,575,307 | Bachmann | Mar. 2, 1926 |
| 1,642,583 | Hanson | Sept. 13, 1927 |
| 1,998,783 | Leach et al. | Apr. 23, 1935 |
| 2,185,519 | Randall | Jan. 2, 1940 |
| 2,244,586 | Venable | June 3, 1941 |
| 2,286,293 | Mall | June 16, 1942 |
| 2,386,563 | Moore | Oct. 9, 1945 |